United States Patent Office 3,408,387
Patented Oct. 29, 1968

3,408,387
AMIDOAROXYALKANOLAMINES
Ralph Howe and Leslie Harold Smith, Macclesfield, England, assignors to Imperial Chemical Industries Limited, London, England, a corporation of Great Britain
No Drawing. Filed Sept. 17, 1965, Ser. No. 488,252
Claims priority, application Great Britain, Sept. 30, 1964, 39,774/64
22 Claims. (Cl. 260—482)

This invention relates to new alkanolamine derivatives which possess $\beta$-adrenergic blocking activity, for example such activity in cats, and which are therefore likely to be useful in the treatment or prophylaxis of heart diseases, for example angina pectoris and cardiac arrhythmias, and in the treatment of hypertension and phaeochromocytoma, in man.

According to the invention we provide alkanolamine derivatives of the formula:

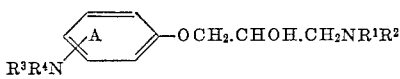

wherein $R^1$ stands for hydrogen or for an alkyl radical; wherein $R^2$ stands for an alkyl radical, optionally substituted by one or more radicals selected from hydroxy, alkoxy and aryloxy radicals, or for a cycloalkyl or alkenyl radical, or for an aralkyl radical, optionally substituted by one or more radicals selected from halogen atoms and alkoxy radicals; wherein $R^3$ stands for hydrogen or for an alkyl radical; wherein $R^4$ stands for an acyl radical; and wherein the benzene ring A may optionally be further substituted by one or more alkyl radicals or by the —CH=CH—CH=CH— radical (that is, by the radical which together with the benzene ring A forms a naphthalene ring); and the esters thereof; and the aldehyde condensation products thereof; and the acid-addition salts thereof.

It is to be understood that the above definition of alkanolamine derivatives encompasses all possible stereoisomers thereof, and mixtures thereof.

As a suitable value for $R^1$ or $R^3$ when it stands for an alkyl radical, or for the optional alkyl substituent in the benzene ring A, there may be mentioned, for example, an alkyl radical of not more than 4 carbon atoms, for example the methyl or ethyl radical.

As a suitable value for $R^2$ when it stands for an alkyl radical there may be mentioned, for example, an alkyl radical of not more than 12 carbon atoms, for example the ethyl, n-propyl, isopropyl, s-butyl, t-butyl or 1-methyloctyl radical. As suitable values for the optional alkoxy or aryloxy substituents in $R^2$ when it stands for an alkyl radical there may be mentioned, for example, alkoxy radicals of not more than 5 carbon atoms, for example methoxy or propoxy radicals, or aryloxy radicals of not more than 10 carbon atoms, for example phenoxy or 4-chlorophenoxy radicals. Thus, a specific value for $R^2$ when it stands for a substituted alkyl radical is, for example, the 2-hydroxy-1,1-dimethylethyl, 2-n-propoxyethyl or 2-(4-chlorophenoxy)-1,1-dimethylethyl radical.

As a suitable value for $R^2$ when it stands for a cycloalkyl radical there may be mentioned, for example, a cycloalkyl radical of not more than 8 carbon atoms, for example the cyclopentyl radical.

As a suitable value for $R^2$ when it stands for an alkenyl radical there may be mentioned, for example, an alkenyl radical of not more than 6 carbon atoms, for example the allyl radical.

As a suitable value for $R^2$ when it stands for an aralkyl radical there may be mentioned, for example, an alkyl radical of not more than 6 carbon atoms substituted by a phenyl radical or by a phenyl radical itself substituted by one or more radicals selected from halogen atoms, for example chlorine and bromine atoms, and alkoxy radicals, for example alkoxy radicals of not more than 5 carbon atoms, for example methoxy radicals. Thus, a specific value for $R^2$ when it stands for a substituted or unsubstituted aralkyl radical is, for example, the 1-methyl-3-phenylpropyl, 2-(4-methoxyphenyl)-1-methylethyl or 3-(4-chlorophenyl)-1,1-dimethylpropyl radical.

As a suitable value for $R^4$ there may be mentioned, for example, an acyl radical derived from a carboxylic acid or from a sulphonic acid. Such a radical may be, for example, an alkanoyl radical, for example an alkanoyl radical of not more than 6 carbon atoms, for example the acetyl or hexanoyl radical; an alkenoyl radical, for example an alkenoyl radical of not more than 6 carbon atoms, for example the crotonoyl radical; an aroyl radical, for example an aroyl radical of not more than 10 carbon atoms, for example the benzoyl or p-chlorobenzoyl radical; an aralkanoyl radical, for example an aralkanoyl radical of not more than 10 carbon atoms, for example the phenylacetyl radical; an alkanesulphonyl radical, for example an alkanesulphonyl radical of not more than 6 carbon atoms, for example the methanesulphonyl radical; an arenesulphonyl radical, for example an arenesulphonyl radical of not more than 10 carbon atoms, for example the benzenesulphonyl or toluene-p-sulphonyl radical; or an alkoxycarbonyl radical, for example an alkoxycarbonyl radical of not more than 6 carbon atoms, for example the ethoxycarbonyl radical.

As suitable esters of the alkanolamine derivatives there may be mentioned, for example, O-esters derived from an aliphatic carboxylic acid, for example such an acid of not more than 10 carbon atoms, for example acetic or hexanoic acid, and the acid-addition salts thereof.

It is to be understood that by the expression aldehyde condensation products we mean oxazolidine derivatives of the formula:

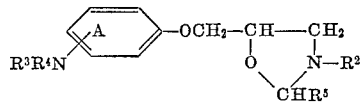

wherein $R^2$, $R^3$, $R^4$ and A have the meanings stated above and wherein $R^5$ stands for hydrogen or for an alkyl radical, and the acid-addition salts thereof, which are derived from the alkanolamine derivatives of the invention of the stated formula wherein $R^1$ stands for hydrogen.

As a suitable value for $R^5$ when it stands for an alkyl radical there may be mentioned, for example, an alkyl radical of not more than 4 carbon atoms, for example the isopropyl radical.

Specific compounds of the present invention are, for example,
1-(4-acetamidophenoxy)-3-isopropylamino-2-propanol;
1-(4-methanesulphononamidophenoxy)-3-isopropylamino-2-propanol;
1-(4-benzenesulphonamidophenoxy)-3-isopropylamino-2-propanol;
1-(4-acetamidophenoxy)-3-t-butylamino-2-propanol;
1-(4-acetamidophenoxy)-3-(2-hydroxy-1,1-dimethylethylamino)-2-propanol;
1-(4-acetamidophenoxy)-3-(1-methyl-3-phenylpropylamino)-2-propanol;
1-(4-acetamidophenoxy)-3-(2-p-methoxyphenyl-1-methylethylamino)-2-propanol;
1-(4-acetamidophenoxy)-3-s-butylamino-2-propanol;
1-(4-toluene-p-sulphonamidophenoxy)-3-isopropylamino-2-propanol;
1-(4-ethoxycarbonylaminophenoxy)-3-isopropylamino-2-propanol;
1-(4-benzamidophenoxy)-3-isopropylamino-2-propanol;

1-[4-(N-methyl)-methanesulphonamidophenoxy]-3-isopropylamino-2-propanol;
1-(2-methanesulphonamidophenoxy)-3-isopropylamino-2-propanol;
1-(3-acetamidophenoxy)-3-isopropylamino-2-propanol;
1-(2-benzamido-4-methylphenoxy)-3-isopropylamino-2-propanol;
1-(4-benzamido-1-naphthyloxy)-3-isopropylamino-2-propanol;
1-(4-acetamido-1-naphthyloxy)-3-isopropylamino-2-propanol;
1-(4-acetamidophenoxymethyl)-2-isopropylaminoethyl hexanoate and 5-(4-acetamidophenoxymethyl)-3-isopropyloxazolidine and the acid-addition salts thereof, and of these, particularly valuable alkanolamine derivatives are 1-(4-acetamidophenoxy)-3-isopropylamino-2-propanol;
1-(4-acetamidophenoxy)-3-t-butylamino-2-propanol;
1-(4-benzamidophenoxy)-3-isopropylamino-2-propanol;
1-(4-methanesulphonamidophenoxy)-3-isopropylamino-2-propanol;
1-(4-acetamidophenoxymethyl)-2-isopropylaminoethyl hexanoate; and
5-(4-acetamidophenoxymethyl)-3-isopropyloxazolidine and the hydrochlorides thereof.

As suitable acid-addition salts of the alkanolamine derivatives of the invention, or the esters or the oxazolidines derived therefrom, there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 ("Zeo-Karb" is a trademark). Relatively insoluble salts, for example the 1,1-methylene-bis-(2-hydroxy-3-naphthoates), have the advantage that they afford prolonged blood levels of the medicament.

According to a further feature of the invention we provide a process for the manufacture of the alkanolamine derivatives of the invention which comprises the interaction of a compound of the formula:

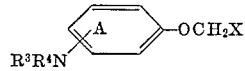

wherein $R^3$, $R^4$ and A have the meanings stated above, and wherein X stands for the group

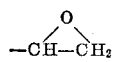

or the group —CHOH.CH$_2$Y, wherein Y stands for a halogen atom, or of mixtures of such compounds wherein X has both meanings stated above, with an amine of the formula NHR$^1$R$^2$, wherein $R^1$ and $R^2$ have the meanings stated above.

As a suitable value for Y there may be mentioned, for example, a chlorine or bromine atom. The interaction may be carried out at ambient temperature or it may be accelerated or completed by the application of heat, for example by heating to a temperature of 90–110° C.; it may be carried out at atmospheric or at an elevated pressure, for example by heating in a sealed vessel; and it may be carried out in an inert diluent or solvent, for example methanol or ethanol, or an excess of the amine of the formula NHR$^1$R$^2$, wherein $R^1$ and $R^2$ have the meanings stated as above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of those of the alkanolamine derivatives of the invention wherein $R^1$ stands for hydrogen and $R^2$ does not stand for a hydrogenolysable group which comprises the hydrogenolysis of a compound of the formula:

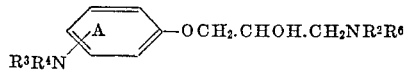

wherein $R^2$, $R^3$, $R^4$ and A have the meanings stated above and wherein $R^6$ stands for a hydrogenolysable radical.

As a suitable value for $R^6$ there may be mentioned, for example, the benzyl radical. The hydrogenolysis may be effected, for example, by catalytic hydrogenation, for example by hydrogenation in the presence of a palladium-on-charcoal catalyst, in an inert diluent or solvent, for example ethanol. The process may be accelerated or completed by the presence of an acidic catalyst, for example oxalic acid.

The starting material used in the last-mentioned process may be obtained by the acylation of the corresponding compound wherein $R^4$ stands for hydrogen with an acylating agent derived from the acid of the formula $R^4$—OH, wherein $R^4$ has the meaning stated above.

According to a further feature of the invention we provide a process for the manufacture of the esters of the alkanolamine derivatives of the invention which comprises the interaction of an acid-addition salt of the corresponding unesterified alkanolamine derivative with an acylating agent.

As a suitable acylating agent there may be mentioned, for example, an acid halide or acid anhydride derived from an aliphatic carboxylic acid, for example such an acid of not more than 10 carbon atoms. Thus a suitable acylating agent is, for example, acetic anhydride or hexanoyl chloride. The acylation may be carried out in a diluent or solvent, which, in the case where an acid anhydride is used as acylating agent, many conveniently be the acid from which the anhydride is derived.

According to a further feature of the invention we provide a process for the manufacture of the oxazolidine derivates of the alkanolamines of the invention which comprises the interaction of the corresponding alkanolamine dreivative wherein $R^1$ stands for hydrogen, or an acid-addition salt thereof, with an aldehyde of the formula $R^5$.CHO, wherein $R^5$ has the meaning stated above.

The said interaction may be carried out in a diluent or solvent, for example ethanol, optionally in the presence of a catalyst, for example hydrochloric acid, acetic acid or iodine, and it may be accelerated or completed by the application of heat. The water formed during the reaction may optionally be removed by azeotropic distillation using a suitable solvent, for example benzene, toluene or chloroform, as entraining agent, or it may optionally be removed by means of a dehydrating agent, for example anhydrous potassium carbonate.

As stated above, the alkanolamine derivatives of the present invention are likely to be of value in the treatment or prophylaxis of heart diseases.

According to a further feature of the invention, therefore, we provide pharmaceutical compositions comprising as active ingredient one or more alkanolamine derivatives of the invention, or esters thereof, or aldehyde condensation products thereof, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solutions or suspensions, and dispersible powders.

It is expected that the preferred compounds would be given to man at an oral dose of between 20 mg. and 400 mg. daily, at doses spaced at 4–6 hourly intervals, or at an intravenous dose of between 1 mg. and 20 mg. daily. preferred oral dosage forms are tablets or capsules containing 10 mg. or 40 mg. of active ingredient. Preferred intravenous dosage forms are sterile aqueous solutions of non-toxic acid-addition salts of the alkanolamine derivatives, containing between 0.05% and 1% w./v. of active ingredient, and more particularly containing 0.1% w./v. of active ingredient.

The invention is illustrated but not limited by the following examples in which the parts are by weight:

Example 1

A mixture of 0.5 part of 1-(4-methanesulphonamidophenoxy)-3-(N-benzylisopropylamino) - 2 - propanol, 0.3 part of 5% palladium-on-charcoal catalyst and 20 parts of ethanol is shaken with hydrogen at a pressure of 100 atmospheres and at ambient temperature until uptake of hydrogen ceases. The mixture is filtered and the filtrate is evaporated to dryness under reduced pressure. The residue is crystallised from a mixture of ethyl acetate and petroleum ether (B.P. 60–80° C.), and there is thus obtained 1 - (4 - methanesulphonamidophenoxy) - 3 - isopropylamino-2-propanol, M.P. 126–128° C.

The 1-(4-methanesulphonamidophenoxy)-3-(N-benzylisopropylamino)-2-propanol used as starting material may be obtained as follows:

A mixture of 21 parts of 1-(4-nitrophenoxy)-2,3-epoxypropane and 14.9 parts of N-benzylisopropylamine is heated at 100° C. for 2 hours. The mixture is then dissolved in 100 parts of ethyl acetate and acidified with ethereal hydrogen chloride solution. The mixture is filtered and the solid residue is washed with ethyl acetate. There is thus obtained 1-(4-nitrophenoxy)-3-(N-benzylisopropylamino)-2-propanol hydrochloride, M.P. 147–148° C. 11.4 parts of this salt are added to a rapidly stirred mixture of 30 parts of iron powder, 120 parts of ethanol and 0.5 part of concentrated hydrochloric acid heated to reflux temperature. The mixture is stirred and heated under reflux for 4 hours, 0.5 part of concentrated hydrochloric acid being added after the first hour. To the mixture there is then added 4 parts of aqueous 10N-sodium hydroxide solution and the hot mixture is filtered. The filtrate is evaporated to dryness under reduced pressure and the residue is distilled. There is thus obtained 1-(4-aminophenoxy) - 3 - (N - benzylisopropylamino)-2-propanol, B.P. 198–200° C./0.15 mm. To a stirred mixture of 2.5 parts of this compound in 40 parts of ether there is added, at 15° C., a mixture of 0.84 part of methanesulphonyl chloride in 20 parts of ether. The mixture is stirred for 2 hours and the ethereal layer is then decanted and evaporated to dryness under reduced pressure. The residue is dissolved in 20 parts of water, the pH of the solution is adjusted to 7 and the solution is extracted with 15 parts of ethyl acetate. The extract is dried with anhydrous magnesium sulphate and filtered and to the filtrate there is added 5 parts of petroleum ether (B.P. 60–80° C.). The solid which is precipitated is collected by filtration and crystallised from a mixture of ethyl acetate and petroleum ether (B.P. 60–80° C.). There is thus obtained 1-(4-methanesulphonamidophenoxy)-3-(N-benzylisopropylamino)-2-propanol, M.P. 112–114° C.

Example 2

The process described in Example 1 is repeated except that 0.6 part of 1-(4-benzenesulphonamidophenoxy)-3-(N-benzylisopropylamino)-2-propanol is used in place of 0.5 part of 1-(4-methanesulphonamidophenoxy)-3-(N-benzylisopropylamino)-2-propanol. There is thus obtained 1-(4-benzenesulphonamidophenoxy) - 3-isopropylamino-2-propanol, M.P. 130° C. after crystallisation from a mixture of ethyl acetate and petroleum ether (B.P. 60–80° C.).

The 1-(4-benzenesulphonamidophenoxy)-3-(N-benzylisopropylamino)-2-propanol (M.P. 130–132° C., crystallised from cyclohexane) used as starting material may be obtained according to the process described at the end of Example 1 for the preparation of 1-(4-methanesulphonamidophenoxy) - 3-(N-benzylisopropylamino)-2-propanol by replacing the methanesulphonyl chloride by benzenesulphonyl chloride.

Example 3

A mixture of 2 parts of 1-(4-acetamidophenoxy)-2,3-epoxypropane and 10 parts of isopropylamine is stirred at ambient temperature for 16 hours. The resulting solution is evaporated to dryness under reduced pressure and the residue is crystallised from butyl acetate. There is thus obtained 1-(4-acetamidophenoxy)-3-isopropylamino-2-propanol, M.P. 134–136° C.

The above base is dissolved in warm isopropanol and to the solution is added an excess of ethereal hydrogen chloride solution. The mixture is cooled and filtered, and the solid product is washed with ether and dried. There is thus obtained 1-(4-acetamidophenoxy)-3-isopropylamino-2-propanol hydrochloride monohydrate, M.P. 140–142° C.

The 1-(4-acetamidophenoxy)-2,3-epoxypropane used as starting material may be obtained as follows:

To a solution of 4.5 parts of 4-acetamidophenol and 1.5 parts of sodium hydroxide in 50 parts of water at 15° C. there is added 3.5 parts of epichlorohydrin. The mixture is stirred for 16 hours at ambient temperature, filtered and the solid residue is washed with water. There is thus obtained 1-(4-acetamidophenoxy)-2,3-epoxypropane, M.P. 110° C.

Example 4

A mixture of 0.98 part of 1-(4-acetamidophenoxy)-2,3-epoxypropane, 8 parts of t-butylamine and 12 parts of ethanol is heated in a sealed vessel at 100° C. for 10 hours. The solution thus obtained is evaporated to dryness, the residue is dissolved in 8 parts of ethyl acetate and 4 parts of petroleum ether (B.P. 60–80° C.) are added. The mixture is filtered, the solid residue being discarded, and the filtrate is kept at ambient temperature for 1–3 days and then filtered again. The solid residue is crystallised from ethyl acetate and there is thus obtained 1-(4-acetamidophenoxy) - 3-t-butylamino - 2 - propanol, M.P. 126° C.

The process described above is repeated except that the appropriate amine is used as starting material in place of t-butylamine. There are thus obtained the products described in the following table:

$$CH_3CONH-\!\!\left\langle\!\!\!\bigcirc\!\!\!\right\rangle\!\!-OCH_2CHOHCH_2NHR^2$$

| $R^2$ | M.P.(° C.) |
|---|---|
| $-\underset{CH_3}{\overset{CH_3}{C}}-CH_2OH$ | 116–118 |
| $-\underset{CH_3}{CH}-(CH_2)_6-CH_3$ | 94–96 |
| $-CH_2CH=CH_2$ | 104–105 |
| ⟨▱⟩ (cyclopentyl) | 122–124 |
| $-\underset{CH_3}{CH}-CH_2CH_2C_6H_5$ | 125–126 |
| $-\underset{CH_3}{CH}-CH_2-\!\!\left\langle\!\!\!\bigcirc\!\!\!\right\rangle\!\!-OCH_3$ | 117–118 |
| $-CH_2CH_2CH_3$ | [1] 127–129 |
| $-\underset{CH_3}{\overset{CH_3}{C}}-CH_2CH_2-\!\!\left\langle\!\!\!\bigcirc\!\!\!\right\rangle\!\!-Cl$ | 132–133 |
| $-\underset{CH_3}{CH}-CH_2CH_3$ | 83–84 |

[1] Crystallised from butyl acetate in place of ethyl acetate.

The process described above is repeated except that diethylamine is used as starting material in place of t- butylamine, and that the base is converted to the oxalate by known means. The product is crystallised from ethanol and there is thus obtained 1-(4-acetamidophenoxy)-3-diethylamino-2-propanol oxalate, M.P. 168–170° C. (with decomposition).

Example 5

The process described in the first part of Example 1 is repeated except that the appropriate 3-(N-benzylisopropylamino)-2-propanol derivative is used in place of 1-(4-methanesulphonamidophenoxy) - 3 - (N - benzylisopropylamino)-2-propanol. There are thus obtained the products described in the following table:

R⁴NH—⟨ ⟩—OCH₂CHOHCH₂NHCH(CH₃)₂

| R⁴ | M.P.(° C.) | Crystallisation solvent |
| --- | --- | --- |
| Cl—⟨ ⟩—CO— | 178–180 | Isopropanol. |
| CH₃CH=CH₂—CO— | 127–128 | Ethyl acetate. |
| CH₃—⟨ ⟩—SO₂— | 88–89 | Do. |
| C₆H₅CH₂—CO— | 138–140 | Do. |
| CH₃(CH₂)₄—CO— | 136–138 | Do. |
| C₂H₅O—CO— | 102–103 | Do. |

The starting materials used in the above process may be obtained by the process described in the last part of Example 1, except that methanesulphonyl chloride is replaced by the appropriate acid chloride. 1-(4-p-chlorobenzamidophenoxy) - 3 - (N - benzylisopropylamino) - 2 - propanol has M.P. 120–122° C. when crystallised from ethanol; the other starting materials were used without characterisation.

Example 6

A mixture of 2.7 parts of 1-(4-benzamidophenoxy)-2,3-epoxypropane and 10 parts of isopropylamine is heated under reflux for 1 hour. The resulting mixture is evaporated to dryness under reduced pressure and the residue is crystallised from a mixture of n-propanol and butyl acetate. There is thus obtained 1-(4-benzamidophenoxy)-3-isopropylamino-2-propanol, M.P. 172–174° C. The 1-(4-benzamidophenoxy)-2,3-epoxypropane used as starting material may be obtained as follows:

15.8 parts of epichlorohydrin are added at 15° C. to a solution of 42 parts of 4-benzamidophenol and 8 parts of sodium hydroxide in 100 parts of water. The mixture is stirred for 16 hours at ambient temperature and is then filtered. The solid residue is washed with water and crystallised from isopropanol. There is thus obtained 1-(4-benzamidophenoxy)-2,3-epoxypropane, M.P. 138–139° C.

Example 7

A mixture of 0.6 part of 1-[4-(N-methyl)methanesulphonamidophenoxy]-2,3-epoxypropane and 10 parts of isopropylamine is heated under reflux for 2 hours. The resulting mixture is evaporated to dryness under reduced pressure and the residue is crystallised from petroleum ether (B.P. 100–120° C.). There is thus obtained 1-[4-(N-methyl)methanesulphonamidophenoxy] - 3 - isopropylamino-2-propanol, M.P. 96–98° C.

The 1-[4-(N-methyl)methanesulphonamidophenoxy]-2,3-epoxypropane used as starting material may be obtained as follows:

0.8 part of epichlorohydrin is added at 15° C. to a solution of 2 parts of 4-(N-methyl)methanesulphonamidophenol and 0.4 part of sodium hydroxide in 50 parts of water. The mixture is stirred for 16 hours at ambient temperature and filtered and the solid residue is washed with water and dried. There is thus obtained 1-[4-(N-methyl)methanesulphonamidophenoxy]-2,3-epoxypropane, M.P. 81–83° C.

Example 8

A mixture of 0.7 part of 1-(2-methanesulphonamidophenoxy)-3-(N-benzylisopropylamino)-2-propanol hydrochloride, 0.3 part of 5% palladium-on-charcoal catalyst and 40 parts of ethanol is shaken with hydrogen at a pressure of 100 atmospheres and at ambient temperature until uptake of hydrogen ceases. The mixture is filtered and the filtrate is evaporated to dryness under reduced pressure. The residue is shaken with a mixture of 2 parts of a saturated aqueous solution of sodium bicarbonate and 25 parts of warm ethyl acetate. The ethyl acetate layer is separated, dried over anhydrous magnesium sulphate and added to a saturated solution of oxalic acid in ether. The mixture is filtered and there is thus obtained as solid product 1-(2-methanesulphonamidophenoxy)-3-isopropylamino-2-propanol oxalate, M.P. 190–192° C. (with decomposition).

The 1-(2-methanesulphonamidophenoxy)-3-(N-benzylisopropylamino)-2-propanol hydrochloride used as starting material may be obtained as follows:

A mixture of 44.5 parts of 1-chloro-3-(2-nitrophenoxy)-2-propanol and 35.5 parts of N-benzylisopropylamine is heated at 120° C. for 10 hours. The mixture is then dissolved in 75 parts of ethyl acetate and the solution is filtered. The filtrate is acidified with ethereal hydrogen chloride and kept at ambient temperature for 16 hours. The mixture is then filtered and the solid residue is washed with ethyl acetate and crystallised from a mixture of ethyl acetate and isopropanol. There is thus obtained 1 - (2 - nitrophenoxy) - 3 - (N-benzylisopropylamino) - 2 - propanol hydrochloride, M.P. 140–142° C. 11.4 parts of this salt are added to a rapidly-stirred mixture of 30 parts of iron powder, 200 parts of ethanol and 0.5 part of concentrated hydrochloric acid heated to reflux temperature. The mixture is stirred and heated under reflux for 5 hours. To the mixture there are then added 4 parts of aqueous 10N-sodium hydroxide solution and the hot mixture is filtered. The filtrate is evaporated to dryness under reduced pressure and the residue is dissolved in 50 parts of aqueous 2N-hydrochloric acid. The solution is treated with carbon and filtered. The filtrate is poured into a mixture of 20 parts of aqueous 11N-sodium hydroxide solution and ice. The mixture is filtered and the solid residue is washed with water, dried and crystallised from cyclohexane. There is thus obtained 1-(2-aminophenoxy)-3-(N-benzylisopropylamino)-2-propanol, M.P. 82–84° C. To a stirred mixture of 2.5 parts of this base in 120 parts of ether there is added, at 15° C., a mixture of 0.84 part of methanesulphonyl chloride in 20 parts of ether. The mixture is stirred for 2 hours and the ethereal layer is then decanted and evaporated to dryness under reduced pressure. The residue is dissolved in 50 parts of water, the pH of the solution is adjusted to 7 with aqueous sodium bicarbonate solution and the solution is then extracted with 15 parts of ethyl acetate. The extract is dried with anhydrous sodium sulphate and filtered and the filtrate is evaporated to dryness under reduced pressure. The residue is dissolved in ether and the solution is acidified with ethereal hydrogen chloride solution. The mixture is filtered and the solid residue is washed with ether. There is thus obtained 1 - (2 - methanesulphonamidophenoxy) - 3 - (N-benzylisopropylamino)-2-propanol hydrochloride, M.P. 90–100° C. (with decomposition).

Example 9

A mixture of 7.2 parts of 1-(3-acetamidophenoxy)-3-chloro-2-propanol, 20 parts of isopropylamine and 5 parts of ethanol is heated in a sealed vessel at 100° C. for 10 hours. The resulting mixture is evaporated to dryness under reduced pressure and the residue is dissolved in 50 parts of aqueous 2N-hydrochloric acid. The solution is stirred with carbon, filtered and the filtrate is basified with aqueous 2N-sodium hydroxide solution and extracted with 50 parts of ethyl acetate. The ethyl acetate extract is dried over anhydrous magnesium sulphate and filtered, and the filtrate is evaporated to dryness. The residue is crystallised from ethyl acetate and there is thus obtained 1 - (3 - acetamidophenoxy)-3-isopropylamino-2-propanol, M.P. 99–101° C.

The 1-(3-acetamidophenoxy)-3-chloro-2-propanol used as starting material may be obtained as follows:

4.5 parts of 3-acetamidophenol, 4.5 parts of epichlorohydrin and 0.03 part of piperidine are heated together at 90° C. for 6 hours. The mixture is then evaporated to dryness under reduced pressure. The residue consists of 1-(3-acetamidophenoxy)-3-chloro-2-propanol.

Example 10

A mixture of 1.3 parts of 1-(4-acetamidophenoxy)-3-isopropylamino-2-propanol, 20 parts of ethanol and 2 parts of 36% aqueous formalin solution is heated under reflux for 16 hours. The mixture is evaporated to dryness under reduced pressure. There is thus obtained 5-(4-acetamidophenoxymethyl)-3-isopropyloxazolidine as an oil with prominent infrared absorption bands at 3280, 1658, 1546, 1242, 1036 and 826 cm.$^{-1}$.

Example 11

A mixture of 2.9 parts of 1-(2-benzamido-4-methylphenoxy)-2,3-epoxypropane and 10 parts of isopropylamine is heated under reflux for 1 hour. The resulting mixture is evaporated to dryness under reduced pressure and the residue is shaken with a mixture of dilute aqueous hydrochloric acid solution and ether. The acidic phase is separated and basified with aqueous 2N-sodium hydroxide solution and the mixture is extracted with ethyl acetate. The ethyl acetate extract is dried over anhydrous magnesium sulphate and filtered, and the filtrate is evaporated to dryness under reduced pressure. The residue is dissolved in ether and acidified with a saturated solution of oxalic acid in ether. The mixture is filtered and the solid residue is crystallised from n-propanol. There is thus obtained 1 - (2-benzamido-4-methylphenoxy)-3-isopropylamino-2-propanol hydrogen oxalate, M.P. 188–189° C.

The 1-(2-benzamido-4-methylphenoxy) - 2,3 - epoxypropane used as starting material may be obtained as follows:

4.7 parts of epicholorohydrin are added at 15° C. to a solution of 9 parts of 2-benzamido-4-methylphenol and 2 parts of sodium hydroxide in 50 parts of water. The mixture is stirred for 16 hours at ambient temperature and is then extracted with chloroform. The chloroform extract is dried over magnesium sulphate and filtered and the filtrate is evaporated to dryness under reduced pressure. The residue consists of 1-(2-benzamido-4-methylphenoxy)-2,3-epoxypropane.

Example 12

1 part of 1 - (4-acetamidophenoxy) - 3 - isopropylamino-2-propanol hydrochloride and 5 parts of hexanoyl chloride are heated together at a temperature of 95–100° C. for 50 hours. The solution thus obtained is poured into 100 parts of anhydrous ether, the ethereal solution is decanted from the residual gum, and the gum is washed with a further 100 parts of anhydrous ether, the ethereal solutions being discarded. 50 parts of aqueous 2N-sodium bicarbonate solution are added to the gum and the mixture is extracted 3 times with 80 parts of ether each time. The combined ethereal extracts are dried with anhydrous magnesium sulphate, the mixture is filtered, and 10 parts of a saturated ethereal oxalic acid solution are added to the filtrate. The mixture is filtered and the solid product is crystallised from acetone. There is thus obtained 1-(4-acetamidophenoxymethyl)-2-isopropylaminoethyl hexanoate oxalate, M.P. 151–153° C.

Example 13

A mixture of 20 parts of 4-benzamido-1-naphthol, 200 parts of epichlorohydrin and 1 part of piperidine is heated at a temperature of 95–100° C. for 12 hours. The excess of epichlorohydrin is removed by evaporation under reduced pressure and the residual gum is dissolved in a mixture of 300 parts of isopropylamine and 100 parts of methanol. The solution is heated in a sealed vessel at 110° C. for 12 hours. The resulting solution is evaporated to dryness, the residue is basified with 150 parts of aqueous 2N-sodium hydroxide solution and the mixture is extracted 3 times with 600 parts of ethyl acetate each time. The combined ethyl acetate extracts are dried and evaporated to dryness, and the residue is crystallised from xylene. There is thus obtained 1-(4-benzamido-1-naphthyloxy)-3-isopropylamino-2-propanol, M.P. 177–178° C.

Example 14

The process described in Example 13 is repeated except that 40 parts of 4-acetamido-1-naphthol are used as starting material in place of the 20 parts of 4-benzamido-1-naphthol. There is thus obtained 1-(4-acetamido-1-naphthyloxy)-3-isopropylamino-2-propanol, M.P. 176–178° C. (crystallised from butyl acetate).

Example 15

The process described in Example 14 is repeated except that t-butylamine is used as starting material in place of isopropylamine. There is thus obtained 1-(4-acetamido-1-naphthyloxy)-3-t-butylamino-2-propanol, M.P. 120–121° C. (crystallised from xylene).

What is claimed is:

1. An alkanolamine derivative selected from the group consisting of compounds of the formula:

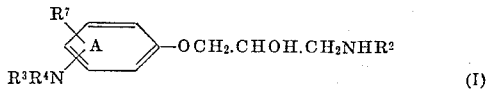

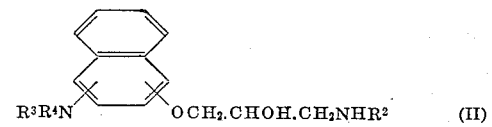

wherein $R^2$ is alkyl of up to 12 carbon atoms, hydroxyalkyl of up to 12 carbon atoms, alkyl of up to 12 carbon atoms substituted by alkoxy of up to 5 carbon atoms, alkyl of up to 12 carbon atoms substituted by aryloxy of up to 10 carbon atoms, cycloalkyl of up to 8 carbon atoms, alkenyl of up to 6 carbon atoms, or alkyl of up to 6 carbon atoms substituted by phenyl, halogenophenyl or phenyl itself substituted by at least one alkoxy of up to 5 carbon atoms; wherein $R^3$ is hydrogen or alkyl of up to 4 carbon atoms; wherein $R^4$ is alkanoyl, alkanesulphonyl or alkoxycarbonyl each of up to 6 carbon atoms or aroyl, aralkanoyl or arenesulphonyl each of up to 10 carbon atoms; and wherein $R^7$ is hydrogen or alkyl of up to 4 carbon atoms; and the pharmaceutically - acceptable acid - addition salts thereof.

2. A compound of the Formula I or II given in claim 1 wherein $R^3$ and $R^7$ are hydrogen; $R^2$ is a branched-chain alkyl of 3 to 4 carbon atoms or a branched-chain alkyl of 3 to 4 carbon atoms substituted by hydroxy, phenyl or methoxyphenyl; and $R^4$ is acetyl, benzoyl, methanesulphonyl, benzenesulphonyl, toluene-p-sulphonyl or ethoxycarbonyl.

3. The compound selected from the group consisting of 1 - (4 - acetamidophenoxy) - 3 - isopropylamino - 2-propanol and the pharmaceutically-acceptable acid-addition salts thereof.

4. The compound selected from the group consisting of 1 - (4 - methanesulphonamidophenoxy) - 3 - isopropylamino-2-propanol and the pharmaceutically acceptable acid-addition salts thereof.

5. Pharmaceutically-acceptable acid-addition salt of an alkanolamine derivative as described in claim 1, which is selected from the group consisting of a hydrochloride, hydrobromide, phosphate, sulphate, oxalate, lactate, tartrate, acetate, salicylate, citrate, benzoate, β-naphthoate, adipate or 1,1-methylene-bis-(2-hydroxy-3-naphthoate).

6. The compound selected from the group consisting of 1 - (4 - benzenesulphonamidophenoxy) - 3 - isopropyl-amino-2-propanol and the pharmaceutically-acceptable acid-addition salts thereof.

7. The compound selected from the group consisting of 1 - (4 -acetamidophenoxy) - 3 - t - butylamino - 2-propanol and the pharmaceutically acceptable acid-addition salts thereof.

8. The compound selected from the group consisting of 1 - (4 - acetamidophenoxy) - 3 - (2 - hydroxy - 1,1-dimethylethylamino)-2-propanol and the pharmaceutically acceptable acid-addition salts thereof.

9. The compound selected from the group consisting of 1 - (4 - acetamidophenoxy) - 3 - (1 - methyl - 3-phenylpropylamino)-2-propanol and the pharmaceutically-acceptable acid-addition salts thereof.

10. The compound selected from the group consisting of 1 - (4 - acetamidophenoxy) - 3 - (2 - p - methoxyphenyl-1-methylethylamino) -2- propanol and the pharmaceutically-acceptable acid-addition salts thereof.

11. The compound selected from the group consisting of 1 - (4 - acetamidophenoxy) - 3 - s - butylamino - 2-propanol and the pharmaceutically-acceptable acid-addition salts thereof.

12. The compound selected from the group consisting of 1 - (4 - toluene - p - sulphonamidophenoxy) - 3-isopropylamino-2-propanol and the pharmaceutically-acceptable acid-addition salts thereof.

13. The compound selected from the group consisting of 1 - (4 - ethoxycarbonylaminophenoxy) - 3 - isopropylamino-2-propanol and the pharmaceutically acceptable acid-addition salts thereof.

14. The compound selected from the group consisting of 1 - (4 - benzamidophenoxy) -3 - isopropylamino-2-propanol and the pharmaceutically-acceptable acid-addition salts thereof.

15. The compound selected from the group consisting of 1 - [4 - (N - methyl) - methanesulphonamidophenoxy]-3-isopropylamino-2-propanol and the pharmaceutically-acceptable acid-addition salts thereof.

16. The compound selected from the group consisting of 1 - (2 - methanesulphonamidophenoxy) - 3 - isopropylamino-2-propanol and the pharmaceutically-acceptable acid-addition salts thereof.

17. The compound selected from the group consisting of 1 - (3 - acetamidophenoxy) - 3 - isopropylamino-2-propanol and the pharmaceutically-acceptable acid-addition salts thereof.

18. The compound selected from the group consisting of 1 - (2 - benzamido - 4 - methylphenoxy) - 3 - isopropylamino-2-propanol and the pharmaceutically-acceptable acid-addition salts thereof.

19. The compound selected from the group consisting of 1 - (4 - benzamido - 1 - naphthyloxy) - 3 - isopropylamino-2-propanol and the pharmaceutically acceptable acid-addition salts thereof.

20. The compound selected from the group consisting of 1 - (4 - acetamido - 1 - naphthyloxy) - 3 - isopropylamino-2-propanol and the pharmaceutically acceptable acid-addition salts thereof.

21. The compound selected from the group consisitng of 1 - (4 - acetamidophenoxymethyl) - 2 - isopropylaminoethyl hexanoate and the pharmaceutically-acceptable acid-addition salts thereof.

22. The compound selected from the group consisting of 5 - (4 - acetamidophenoxymethyl)- 3 - isopropyl-oxazolidine and the pharmaceutically-acceptable acid-addition salts thereof.

References Cited

FOREIGN PATENTS 922,600    4/1963    Great Britain.

OTHER REFERENCES

Beasley et al., J. Pharm. Pharmacol., vol. 10 (1958), pp. 47–59.

NICHOLAS S. RIZZO, *Primary Examiner.*

R. GALLAGHER, *Assistant Examiner.*